United States Patent [19]
Nakajima

[11] Patent Number: 5,007,056
[45] Date of Patent: Apr. 9, 1991

[54] PROCESSING CIRCUIT HAVING AN ERROR DETECTING AND CORRECTING CIRCUIT THEREIN

[75] Inventor: Masaitsu Nakajima, Osaka, Japan

[73] Assignee: Matsushita Electric Industrial Co., Ltd., Japan

[21] Appl. No.: 289,708

[22] Filed: Dec. 27, 1988

[30] Foreign Application Priority Data

Dec. 25, 1987 [JP] Japan .................. 62-330769

[51] Int. Cl.$^5$ .................................. G06F 11/10
[52] U.S. Cl. ........................... 371/37.1; 371/12
[58] Field of Search ................... 371/37.1, 12; 364/200 MS File, 900 MS File

[56] References Cited

U.S. PATENT DOCUMENTS

| | | | |
|---|---|---|---|
| 4,058,851 | 11/1977 | Scheuneman | 364/200 X |
| 4,249,253 | 2/1981 | Gentili | 371/40.3 |
| 4,566,063 | 1/1986 | Zolnowsky | 371/12 X |
| 4,641,305 | 2/1987 | Joyce | 371/12 |
| 4,783,783 | 11/1988 | Nagai | 371/12 |

*Primary Examiner*—Jerry Smith
*Assistant Examiner*—Robert W. Beausoliel
*Attorney, Agent, or Firm*—Lowe, Price, Leblanc, Becker & Shur

[57] ABSTRACT

A processing circuit for receiving input data having an error detecting and correcting code from a data bus is disclosed, that includes a write data latch circuit connected to the data bus for latching the input data; an error detecting and correcting circuit responsive to an output signal from the write data latch circuit for checking the data and correcting the latched data and outputting an error correction signal when the latched data is erroneous; a register circuit for storing correct data sent from the error detecting and correcting circuit; first and second input data latch circuits each of which is connected to the data bus and the register circuit for temporarily latching the input data from the data bus in the absence of the error correction signal, and for temporarily latching the correct data in the presence of the error correction signal; and an arithmetic unit circuit responsive to the input data latched in the first and second input data latch circuits for executing an operation on the input data and responsive to the correct data latched in the first and second input latch circuits for executing the operation on the correct data. The arithmetic unit circuit first executes an operation on unchecked input data while the input data is checked by the error detecting and correcting circuit, and then executes the operation on the correct data sent from the error detecting and correcting circuit only when the input data is erroneous. High reliability of data is thereby achieved without substantially decrease of a program execution speed.

7 Claims, 2 Drawing Sheets

PROCESSING CIRCUIT HAVING AN ERROR DETECTING AND CORRECTING CIRCUIT THEREIN

BACKGROUND OF THE INVENTION

1. Field of the Invention

This invention relates generally to a processing circuit for use with a central processing unit (CPU), and particularly to a processor including an error detecting and correcting circuit.

2. Prior Art

Referring to FIG. 3, the conventional processor system generally comprises a data input portion 209, an error detecting and correcting circuit 208, an output bus 206, a register 207, a first input data latch 204 and a second input data latch 205, an arithmetic unit 201, a first input bus 202, and a second input bus 203.

The operation of the conventional processor system having the above-mentioned structure will be described hereinbelow. When data is inputted, the data and an error detecting and correcting code are inputted into the error detecting and correcting circuit 208 from the data input portion 209. In the error detecting and correcting circuit 208, whether the data is correct or not is checked. If the data is not correct, the data is corrected, and such corrected data is inputted into the register 207 via the output bus 206. When the corrected data is subsequently used in the arithemetic unit 201, the inputted data in the register 207 is read out therefrom at the next cycle step. Then, the data is sent to the arithmetic unit 201 via the first input data latch 204 and the first input bus 202 or via the second input data latch 205 and the second input bus 203. In the arithmetic unit 201, an operation is performed by using such sent data.

FIG. 4 is a timing chart of the operation of the conventional processor system. In a step 0, data is inputted into the data input portion 209. In a step 1, the data is written in the register 207 after the error detection and correction of the data is performed. In a step 2, the written data is read out and latched in the first input data latch 204 or second input data latch 205. Then, the operation is started from a step 3.

However, in such a conventional processor system, the speed of a data reading operation is made low, thereby decreasing the execution speed of a program because the data reading operation is performed so many times on the execution of program steps.

SUMMARY OF THE INVENTION

The present invention has been developed in order to remove the above-described drawbacks inherent to the conventional processor system having the error checking and correcting circuit.

It is, therefore, an object of the present invention to provide a new and useful processing circuit having an error checking and correcting circuit therein.

It is another object of the invention to provide a processing circuit improving high reliability of data without the large decrease of a program execution speed.

In accordance with the present invention there is provided a processing circuit comprising: write data latch circuit means for latching input data having an error detecting and correcting code; error detecting and correcting circuit means responsive to an output signal from the write data latch circuit means for checking the latched data and correcting the latched data and outputting an error correction signal when the latched data is erroneous; register circuit means for storing correct data sent from the error detecting and correcting circuit means; first and second input data latch circuit means responsive to the input data for temporarily latching the input data in the absence of the error correction signal, and responsive to the correct data from the register circuit means in the presence of the error correction signal; and arithmetic unit circuit means responsive to the data latched in the first and second input data latch circuit means for executing an operation.

BRIEF DESCRIPTION OF THE DRAWINGS

The object and features of the present invention will become more readily apparent from the following detailed description of the preferred embodiment taken in conjunction with the accompanying drawings in which.

The same or corresponding elements and parts are designated at like reference numerals throughout the drawings.

DETAILED DESCRIPTION OF THE INVENTION

Figure 1:
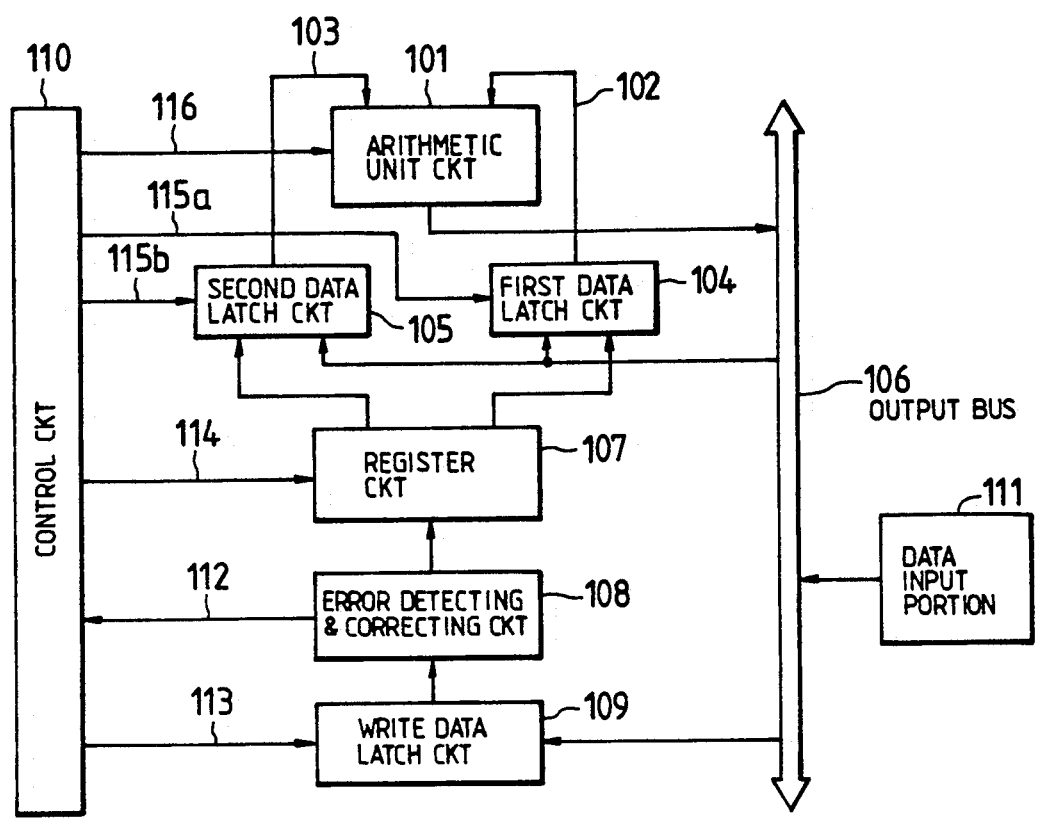
FIG. 1 is a block diagram of a processing circuit according to the present invention.

Referring now to FIG. 1, processing circuit of the present invention generally comprise a data input portion 111, a write data latch 109, an error detecting and correcting circuit 108, an output bus 106, a register 107, a first input data latch 104 and a second input data latch 105, an arithmetic unit 101, a first input bus 102, a second input bus 103, and a control circuit 110. The arithmetic unit 101 receives data from the first and second input data latches 104 and 105 via the input data bus 102 and 103 for executing an operation, and outputs the resultant of the operation to the output bus 106. Each of the first and second input data latches 104 and 105 selects either data sent from the output bus 106 or data sent from the register 107 for latching and outputting to the arithmetic unit 101. The write data latch 109 temporarily stores data and an error detecting and correcting code of this data. The error detecting and correcting circuit 108 receives the data and the error detecting and correcting code for detecting and correcting the data, and outputs such corrected data to the register 107. In addition, an error correction signal 112 is outputted to the control circuit 110. The control circuit 110 receives the error correction signal 112 for controlling the operation of the write data latch 109, the register 107, the first and second input data latches 104 and 105, and the arithmetic unit 101.

The operation of the processing circuit of the invention will be described hereinbelow. When data is stored in the register 107, the data and the error detecting and correcting code thereof are transmitted to the output bus 106 from the data input portion 111. The data and the error detecting and correcting code are temporarily latched in the write data latch 109, and then sends these data and code to the error detecting and correcting circuit 108. In the error detecting and correcting circuit 108, whether the data is correct or not is checked. If the data is not correct, the data is corrected, and such corrected data is inputted into the register 107. At this time, the error correction signal is also outputted to the control circuit 110. Thus, in the register 107, correct data is always stored.

Here, when the corrected data is subsequently used in the arithmetic unit 101 at the next cycle step, the data is sent to one of the first and second input data latches 104 and 105 at the same timing as the latch timing of the write data latch 109. Here, it is assumed that the data is sent to the first input data latch 104. Then, the latched data is transmitted to the arithmetic unit 101 via the first input data bus 102. It is to be noted that an operation can be performed by using unchecked data simultaneously with the storing operation of the data into the register 107 after the error detection and correction. It means that the error correction time of the data is considered only when the data is not correct. However, since there is scarcely any incorrect data, the overhead due to the error detection and correction can be disregarded.

When an error data is detected in the error detecting and correcting circuit 108, i.e. when the data is erroneous, the control circuit 110, in which the error correction signal 112 is received, sends a write inhibition signal 113 to the write data latch 109. Therefore, the operational resultant produced in the arithmetic unit 101 cannot be latched in the write data latch 109. The control circuit 110 outputs a read signal 114 to the register 107 storing a corrected data so that the register sends the corrected data to the first input data latch 105, for example. At this time, the control circuit 110 outputs selecting signals 115a and 115b respectively to the first and second input data latches 104 and 105 because data sent from the register 107 is accepted thereby. In other words, the first and second data latches 104 and 105 respectively selects the correct data from the register circuit 107 in the presence of the error correction signal 112, and respectively selects the data from the output bus 106 in the absence of the error correction signal 112. Then the corrected data is transmitted to the arithmetic unit 101 via the second input data bus 103, and the control circuit 110 output an operation execution signal 116 to the arithmetic unit 101 whereby an operation is performed again by using the corrected data in the arithmetic unit 101. The write inhibition signal 113, the read signal 114, the operation execution signal 116 can be easily produced by a certain timing signal.

Figure 2:
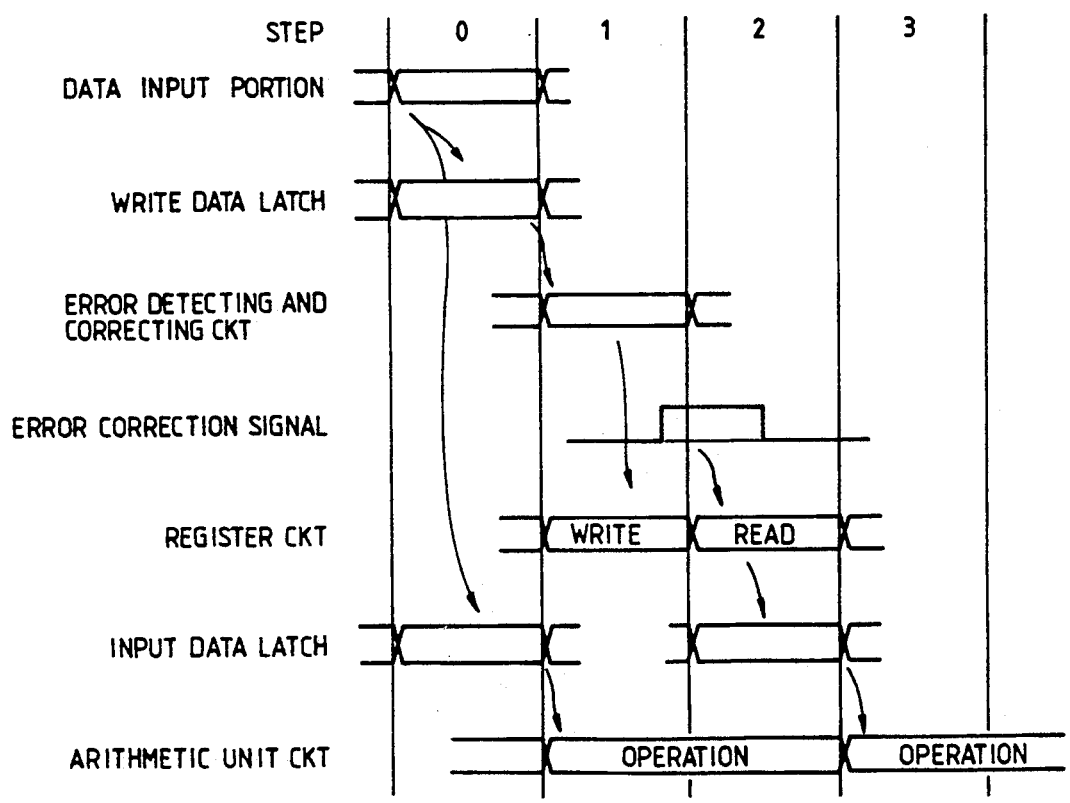
FIG. 2 is a timing chart of the operation of the processing circuit according to the invention.
Figure 3:
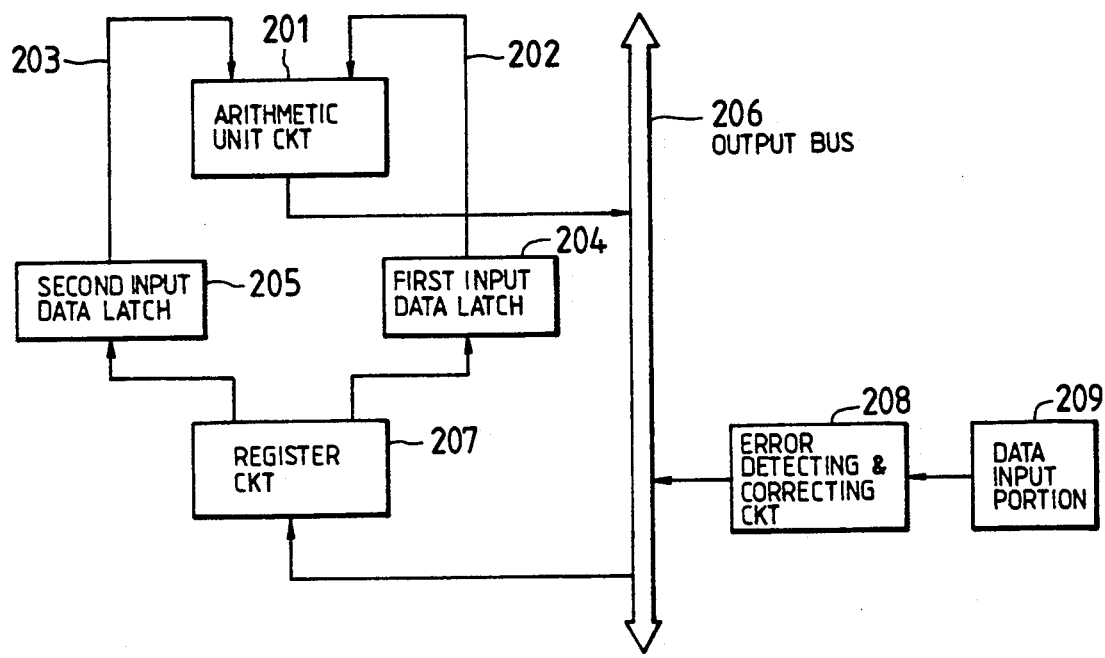
FIG. 3 is a block diagram of a conventional processor system.
Figure 4:
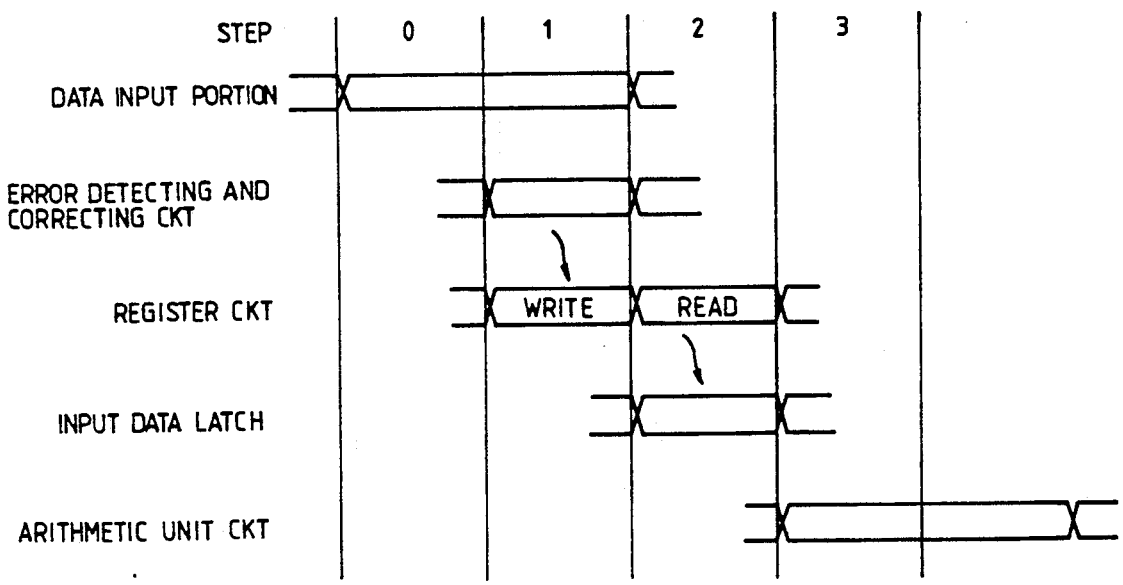
FIG. 4 is a timing chart of the operation of the conventional processor system.

FIG. 2 is a timing chart of the operation of the processing circuit of the invention. In a step 0, data is transmitted to the output bus 106 via the data input portion 111,and inputted into the write data latch 109 and the first input data latch 104. In a step 1, the data is checked and corrected in the error detecting and correcting circuit 108, and written in the register 107. If the data is incorrect, the error correction signal is sent to the control circuit 110. At the same time, the arithmetic unit 101 executes an operation by using the latched data in the first input data latch 104. In a step 2, when the data is correct, the operation is completely finished. If the error data is detected in the error detecting and correcting circuit 108, the corrected data is read out from the register 107, and is latched in the first input data latch 104. Subsequently, in the arithmetic unit 101, the operation is started again from a step 3 by using the corrected data latched in the first input data latch 104.

As will be understood from the above description, in the processing circuit having the error detecting and correcting circuit 108 therein according to the invention, high reliability of data is achieved without the large decrease of a program execution speed.

The above-described embodiment is just an example of the present invention, and therefore, it will be apparent for those skilled in the art that many modifications and variations may be made without departing from the scope of the present invention.

What is claimed is:

1. A processing circuit for receiving input data having an error detecting and correcting code from a data bus, said processing circuit comprising:
    (a) write data latch circuit means connected to said data bus for latching said input data;
    (b) error detecting and correcting circuit means responsive to an output signal from said write data latch circuit means for checking said latched data, generating corrected data from said latched data and outputting an error correction signal when said latched data is erroneous;
    (c) register circuit means for storing correct data sent from said error detecting and correcting circuit means;
    (d) first and second input data latch circuit means, each connected to said data bus and said register circuit means, for temporarily latching said input data from said data bus in the absence of said error correction signal, and for temporarily latching corrected data from said register circuit means in the presence of said error correction signal; and
    (e) arithmetic unit circuit means responsive to said input data latched in said first and second input data latch circuit means for executing an operation on said input data, and responsive to said correct data latched in said first and second input data latch circuit means for executing an operation on said correct data.

2. A processing circuit means as claimed in claim 1, wherein said input data is latched in said first and second input data latch circuit means via an output bus.

3. A processing circuit means as defined in claim 1, wherein said input data is latched in said write data latch circuit means via an output bus.

4. A processing circuit means as claimed in claim 1, wherein said arithmetic unit circuit means outputs an operational resultant to an output bus.

5. A processing circuit means as claimed in claim 1, further comprising a control circuit means responsive to said error correction signal for controlling operations of said write data latch circuit means, said register circuit means, said first and second input data latch circuit means, and said arithmetic unit circuit means such that said control circuit means outputs a write inhibition signal to said write data latch circuit means, a read signal to said register circuit means, selection signals to said first and second data latch circuit means, and an operation execution signal to said arithmetic unit circuit means when said error correction signal is received, whereby said arithmetic unit circuit means executes an operation by using said corrected data.

6. A processing circuit as claimed in claim 1, wherein said write data latch circuit means and said first and second input data latch circuit means simultaneously latch said input data from said data bus in the absence of said error correction signal.

7. A processing circuit for receiving input data having an error detecting and correcting code from a data bus, said processing circuit comprising:

(a) write data latch circuit means connected to said data bus for latching said input data;

(b) error detecting and correcting circuit means responsive to an output signal from said write data latch circuit means for checking said latched data, generating corrected data from said latched data and outputting an error correction signal when said latched data is erroneous;

(c) register circuit means for storing correct data sent from said error detecting and correcting circuit means;

(d) first and second input data latch circuit means, each connected to said data bus and said register circuit means, for temporarily latching said input data from said data bus in the absence of said error correction signal, and for temporarily latching corrected data from said register circuit means in the presence of said error correction signal;

(e) arithmetic unit circuit means coupled to said first and second input data latch means for executing an operation on at least one of said input data and said corrected data that is latched by said first and second input data latch circuit means; and (f) control circuit means for controlling the operation of said arithmetic unit circuit means to perform a first operation on said input data that is latched by said first and second input data latch circuit means while said error detection and correction circuit means is detecting whether an error occurs in said input data, and said control circuit means controls the operation of said write data latch circuit means, said register circuit means and said first and second data latch circuit means, to prevent the result of said first operation from being output to an output bus and to provide said corrected data to said arithmetic unit circuit means only when said error correction signal is generated, thereby causing said arithmetic unit circuit means to perform a second operation on said corrected data.

* * * * *